(12) United States Patent
Yoo

(10) Patent No.: US 6,383,108 B1
(45) Date of Patent: May 7, 2002

(54) APPARATUS FOR CHANGING DIRECTION OF DRIVING FORCE FOR BICYCLES

(75) Inventor: Moon-Soo Yoo, Cheongju-si (KR)

(73) Assignee: World Industry Co., Ltd., (KR)

( * ) Notice: Subject to any disclaimer, the term of this patent is extended or adjusted under 35 U.S.C. 154(b) by 0 days.

(21) Appl. No.: 09/690,013

(22) Filed: Oct. 17, 2000

Related U.S. Application Data

(62) Division of application No. 09/343,244, filed on Jun. 30, 1999, now Pat. No. 6,142,904.

(51) Int. Cl.[7] .................... F16H 48/00; F16H 3/44; B62M 25/00
(52) U.S. Cl. .................. 475/12; 475/297; 74/810.1; 280/236
(58) Field of Search .................. 74/810.1; 475/8, 475/12, 296, 294, 297; 280/236

(56) References Cited

U.S. PATENT DOCUMENTS

| | | | |
|---|---|---|---|
| 2,687,658 A | * 8/1954 | Nelson et al. | 74/810.1 |
| 4,229,997 A | * 10/1980 | Schwerdhofer | 74/810 X |
| 4,501,169 A | * 2/1985 | Stilin | 74/810.1 |
| 4,955,627 A | * 9/1990 | Hartmann | 475/297 X |
| 4,970,915 A | * 11/1990 | Williams, III | 74/810.1 |
| 5,141,476 A | * 8/1992 | Chang | 475/297 |
| 5,435,583 A | 7/1995 | Foster, Jr. | |
| 5,590,894 A | * 1/1997 | Wen | 475/283 X |
| 5,785,625 A | * 7/1998 | Matsuo et al. | 475/297 |
| 5,954,614 A | * 9/1999 | Yoo | 475/12 X |
| 5,957,802 A | * 9/1999 | Yoo | 475/294 |
| 5,964,679 A | * 10/1999 | Matsuo et al. | 475/296 X |
| 6,045,475 A | * 4/2000 | Yoo | 475/296 X |

FOREIGN PATENT DOCUMENTS

| EP | 0 369 925 | 8/1994 |
|---|---|---|
| WO | 99/36307 | 7/1999 |

* cited by examiner

*Primary Examiner*—Charles A. Marmor
*Assistant Examiner*—Roger Pang
(74) *Attorney, Agent, or Firm*—Stephen J. Koundakjian; Charles W. Fallow

(57) ABSTRACT

An apparatus for changing direction of driving force for bicycles, more particularly, an apparatus for changing direction of driving force for bicycles, which can travel bicycles forward by pedaling rearward as well as by pedaling forward, is provided. The apparatus is comprising: a pedal shaft having angular portion; a drive transferring portion composed of a carrier which is engaged with the angular portion, a forward clutch pin group and a reverse clutch pin group are formed therein, a first sun gear having inner surface which is driven by contacting with the forward clutch pin group and a gear portion is formed along outer circumference therein; a drive changing portion composed of a second sun gear which is driven by contacting with the reverse clutch pin group and a gear portion is formed along outer circumference therein, forward planetary gears which are engaged with the first sun gear, reverse planetary gears which are engaged with the forward planetary gears and the second sun gear at the same time; a sprocket which is formed along circumference of the extended portion of the first sun gear; a shaft housing having a plurality of pin holes; fixing means for fastening above elements.

1 Claim, 8 Drawing Sheets

APPARATUS FOR CHANGING DIRECTION OF DRIVING FORCE FOR BICYCLES

CROSS-REFERENCE TO RELATED APPLICATIONS

This application is a divisional of application Ser. No. 09/343,244 (filed on Jun. 30, 1999, now U.S. Pat. No. 6,142,904).

TECHNICAL FIELD

The present invention relates to an apparatus for changing direction of driving force for bicycles, more particularly, to an apparatus for changing direction of driving force for bicycles, which can travel bicycles forward by pedaling rearward as well as by pedaling forward. Also having simple structure and taking up small space, it can be installed on an outer portion of a pedal shaft, a rear wheel hub, more over, in the frame of bicycles.

BACKGROUND ART

In general, a bicycle can travel in only one direction, that is, travel forward by pedaling forward, thereby causing fatigue in a rider's leg and uneven development in a leg muscle when the rider bicycles for a long time.

Thus, in order to solve the problems, many inventors have made an effort in the development of an apparatus for changing direction of driving force for bicycles which can be applied to a conventional one-directional pedaling bicycle.

The apparatus for changing direction of driving force for bicycles developed until now is classified into three fields roughly according to the methods adopted therefor, that is, methods using auxiliary gears, bevel gears and planetary gears.

As a representative invention related to the apparatus for changing direction of driving force for bicycles, Manrzoursos et al. (EPO Publication No. 0,369,925) disclose a system of bicycle motion transmission adopting auxiliary gears, Foster (U.S. Pat. No. 5,435,583) discloses a clutch operated, bi-directional, bicycle gear box adopting bevel gear and a clutch, and the invention of the same inventor of the present application(Korean Patent Application No. 98-1617) discloses an apparatus for changing power direction for bicycle adopting planetary gears.

However, because the above apparatuses are attached outside of the pedal shaft, the attached apparatus is protruding outside of a bicycle frame, thereby obstructing the pedaling of a rider. In addition, due to the protruding portion, it is difficult to attach the apparatus to a newly developed bicycle which can be folded for portability. Also the invention causes noise from engagement of ratchet gears which are indispensable for the inventions.

Thus, the above problems have raised requirements in development of a transmission for a bicycle, which can be attached to a shaft of a rear wheel and makes little noise, as an apparatus for changing direction of driving force for bicycles.

One of the example of such an apparatus for changing direction of driving force for bicycles, which can be installed on a shaft of a rear wheel, is Korean Patent Application 98-1616 of the inventor of the present invention.

Above invention discloses a driving direction changing apparatus of a bicycle hub, wherein a speed changing portion and a driving direction changing portion are installed, whereby it can transform the rearward pedaling to forward driving of bicycles and the speed of the bicycle.

However, the invention needs manipulation of a lever for transforming rearward pedaling to forward driving, more over, the invention can be installed only in the rear hub.

DISCLOSURE OF THE INVENTION

It is an object of the present invention to provide an apparatus for changing direction of driving force for bicycles, which can travel bicycles forward by pedaling rearward as well as by pedaling forward and can be installed on an outer portion of a pedal shaft, a rear wheel hub, more over, in the frame of bicycles.

Another object of the present invention is to provide an apparatus for changing direction of driving force for bicycles, which makes little noise, does not need to manipulate a lever in order to travel bicycles forward by pedaling rearward, and can be pulled back without a load like general bicycles.

According to the first aspect of the above object, there is provided an apparatus for changing direction of driving force for bicycles, the apparatus comprising: a pedal shaft having angular portion; a drive transferring portion composed of a carrier which is engaged with the angular portion, a forward clutch pin group and a reverse clutch pin group are formed therein, a first sun gear having inner surface which is driven by contacting with the forward clutch pin group and a gear portion is formed along outer circumference therein; a drive changing portion composed of a second sun gear which is driven by contacting with the reverse clutch pin group and a gear portion is formed along outer circumference therein, forward planetary gears which are engaged with the first sun gear, reverse planetary gears which are engaged with the forward planetary gears and the second sun gear at the same time; a sprocket which is formed along circumference of the extended portion of the first sun gear; a shaft housing having a plurality of pin holes; fixing means for fastening above elements.

According to the second aspect of the above object, there is provided an apparatus for changing direction of driving force for bicycles, the apparatus comprising: a pedal shaft having angular portion; a drive transferring portion composed of a carrier which is engaged with the angular portion, a forward clutch pin group and a reverse clutch pin group are formed therein, a connecting ring having inner surface which is driven by contacting with the forward clutch pin group; a drive changing portion composed of an inner gear which is driven by contacting with the reverse clutch pin group and a gear portion is formed along inner circumference therein, forward planetary gears which are engaged with the inner gear, reverse planetary gears which are engaged with the forward planetary gears and the ring gear through the connecting ring at the same time; a sprocket which is installed on the connecting ring; a shaft housing having a plurality of pin holes; fixing means for fastening above elements.

According to the third aspect of the above object, there is provided an apparatus for changing direction of driving force for bicycles, the apparatus comprising: a pedal shaft having angular portion; a drive transferring portion composed of a carrier which is engaged with the angular portion, a forward clutch pin group and a reverse clutch pin group are formed therein, a connecting ring having inner surface which is driven by contacting with the forward clutch pin group; a drive changing portion composed of a sun gear which is driven by contacting with the reverse clutch pin group and a gear portion is formed along outer circumference therein, planetary gears which are engaged with the sun gear, a ring gear which is engaged with the planetary gears and connected to the connecting ring through the connecting portion at the same time; a sprocket which is installed on the connecting ring; a shaft housing having a plurality of pin holes; fixing means for fastening above elements.

According to the fourth aspect of the above object, there is provided an apparatus for changing direction of driving force for bicycles, the apparatus comprising: a pedal shaft having angular portion; a drive transferring portion composed of a carrier which is engaged with the angular portion, a forward clutch pin group and a reverse clutch pin group are formed therein, a connecting gear having inner surface which is driven by contacting with the forward clutch pin group and a gear portion is formed therein; a drive changing portion composed of a first bevel gear which is driven by contacting with the reverse clutch pin group and a gear portion is formed therein, a second bevel gear which is engaged with the first bevel gear and gear potion of a connecting gear at the same time; a sprocket which is installed on the connecting gear; a shaft housing having a plurality of pin holes; fixing means for fastening above elements.

BEST MODE FOR CARRYING OUT THE INVENTION

<Embodiment 1>

Figure 1:
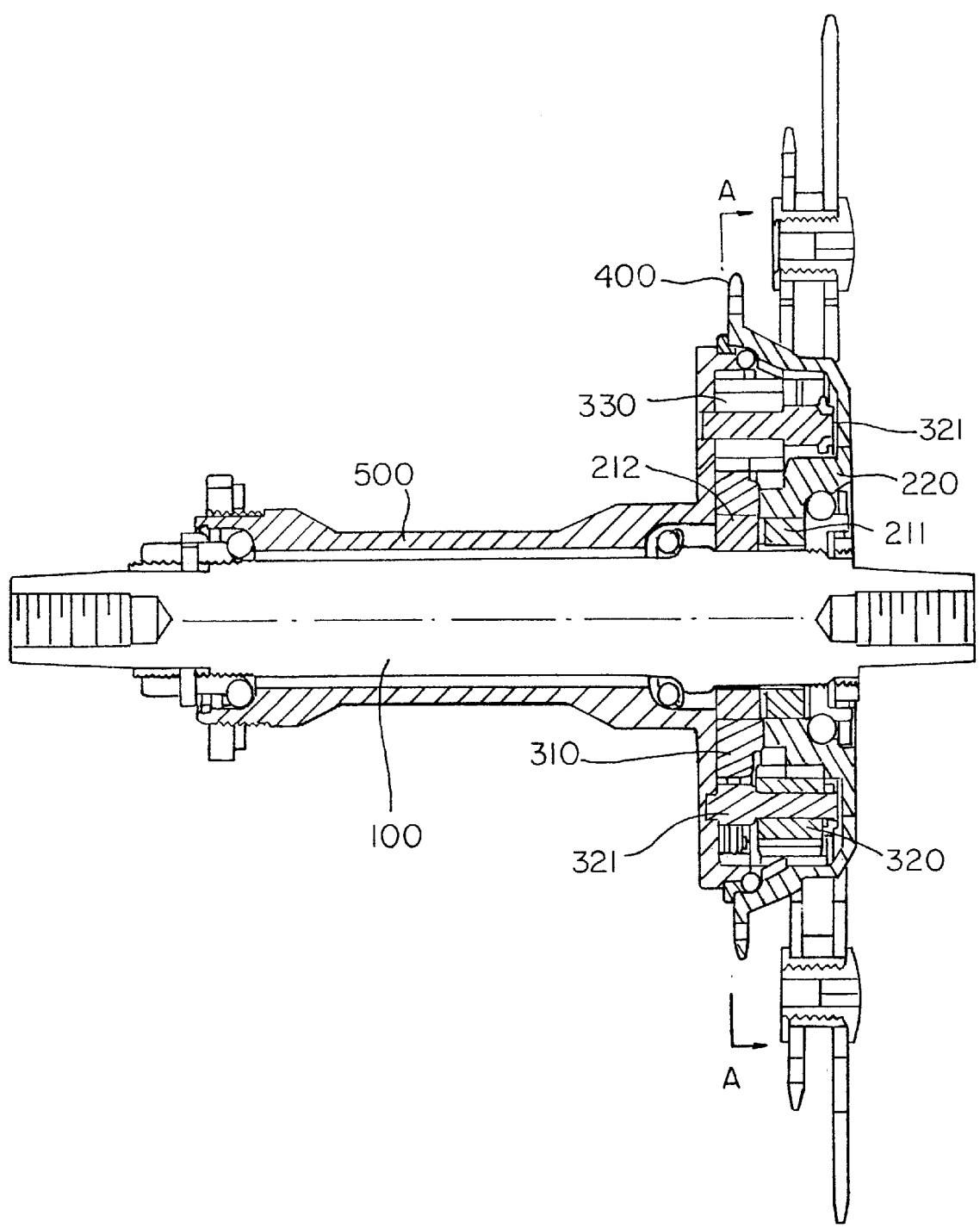
FIG. 1 is a section view of the present invention according to the first embodiment of the present invention adopting two set of planetary gears.
Figure 2:
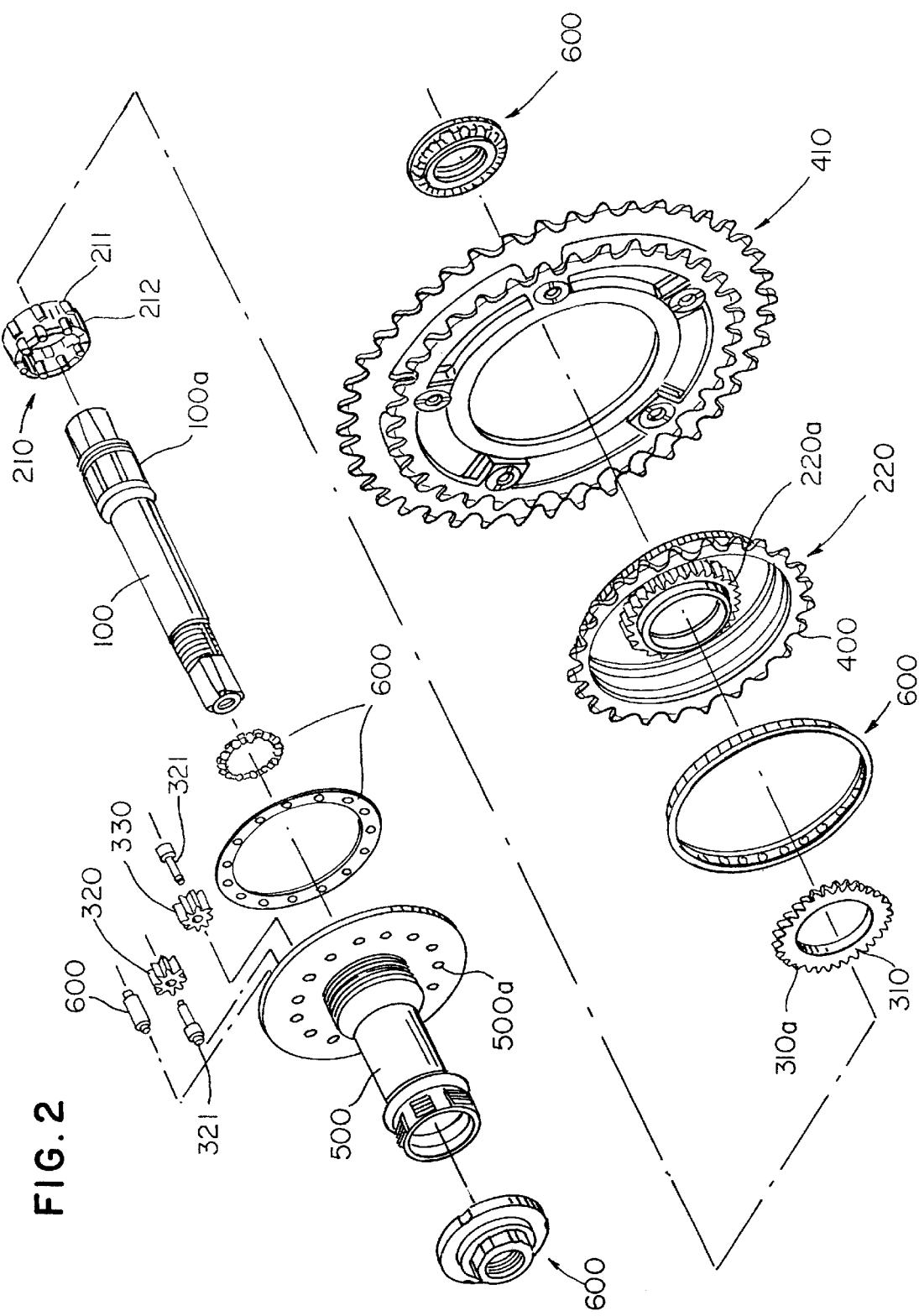
FIG. 2 is an exploded perspective view of the present invention according to the first embodiment.

As shown in FIGS. 1 and 2, the present invention of an apparatus for changing direction of driving force for bicycles comprises, on the whole, a pedal shaft 100 having angular portion 100a, a drive transferring portion 200 which is transferring the driving force of the pedal shaft 100 to a drive changing portion 300 in case of pedaling rearward or to a sprocket 400 directly in case of pedaling forward, said drive changing portion 300 changing the direction of the driving force from the drive transferring portion 200, said a sprocket 400 transferring the driving force to a rear wheel via connection means such as a chain, a shaft housing 500 having a plurality of pin holes 500a, and fixing means 600 for fastening above elements.

The drive transferring portion 200 is composed of a carrier 210 which is engaged with the angular portion 100a, a forward clutch pin group 211 and a reverse clutch pin group 212 are formed therein, a first sun gear 220 having inner surface which is driven by contacting with the forward clutch pin group 211 and a gear portion 220a is formed along outer circumference therein.

The drive changing portion 300 is composed of a second sun gear 310 which is driven by contacting with the reverse clutch pin group 212 and a gear portion 310a is formed along outer circumference therein, forward planetary gears 320 which is engaged with the first sun gear 220, reverse planetary gears 330 which is engaged with the forward planetary gears 320 and the second sun gear 310 at the same time.

Figure 4A:
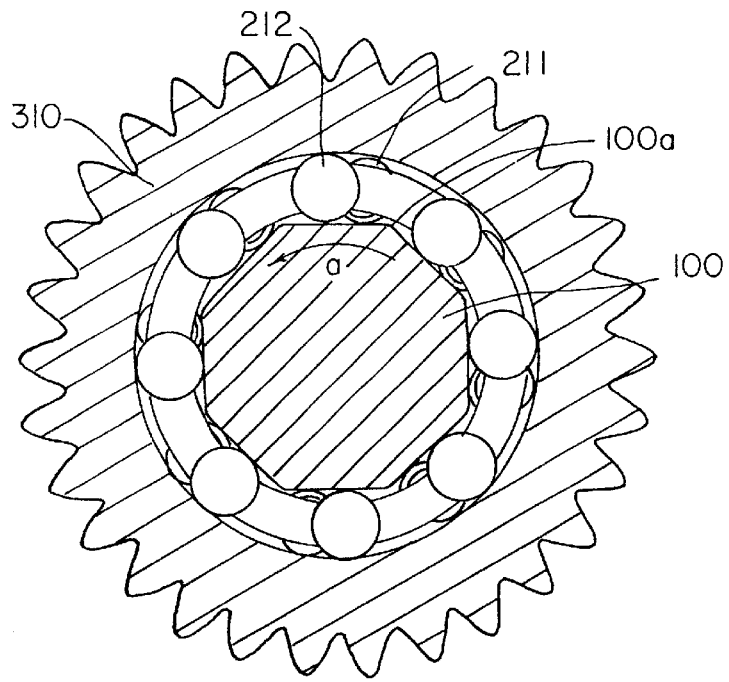
FIG. 4A is an enlarged section view showing the drive transferring portion of the present invention when pedaling forward.
Figure 4B:
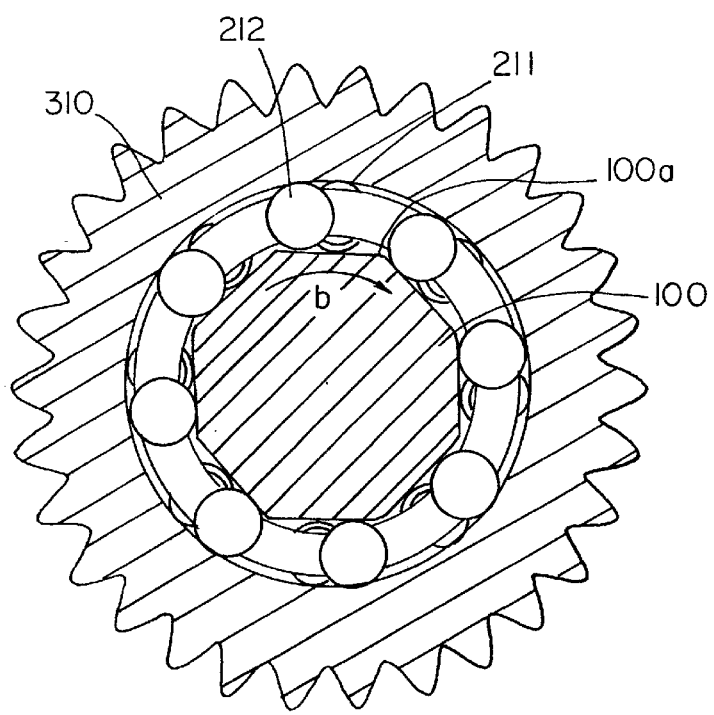
FIG. 4B is an enlarged section view showing the drive transferring portion of the present invention when pedaling rearward.

As shown in FIGS. 4A and 4B, the forward clutch pin group 211 is located between the angular portion 100a of the pedal shaft and the inner surface of the first sun gear 220, and the reverse clutch pin group 212 is located between the angular portion 100a of the pedal shaft and the inner surface of the second sun gear 310.

The forward clutch pin group 211 and the reverse clutch pin group 212 are formed in the carrier 210 with an interval.

So the carrier 210 transfers the driving force of the pedal shaft 100 to the first sun gear 220 when a rider pedals forward, on the other hand, the carrier 210 transfers the driving force of the pedal shaft 100 to the second sun gear 310 when a rider pedals rearward.

The sprocket 400 is formed along outer circumference of the extended portion of the first sun gear 310.

An auxiliary sprocket 410 which is composed of sprockets having different diameters can be installed on a side of the first sun gear 220 for transforming speed of a bicycle.

Figure 3:
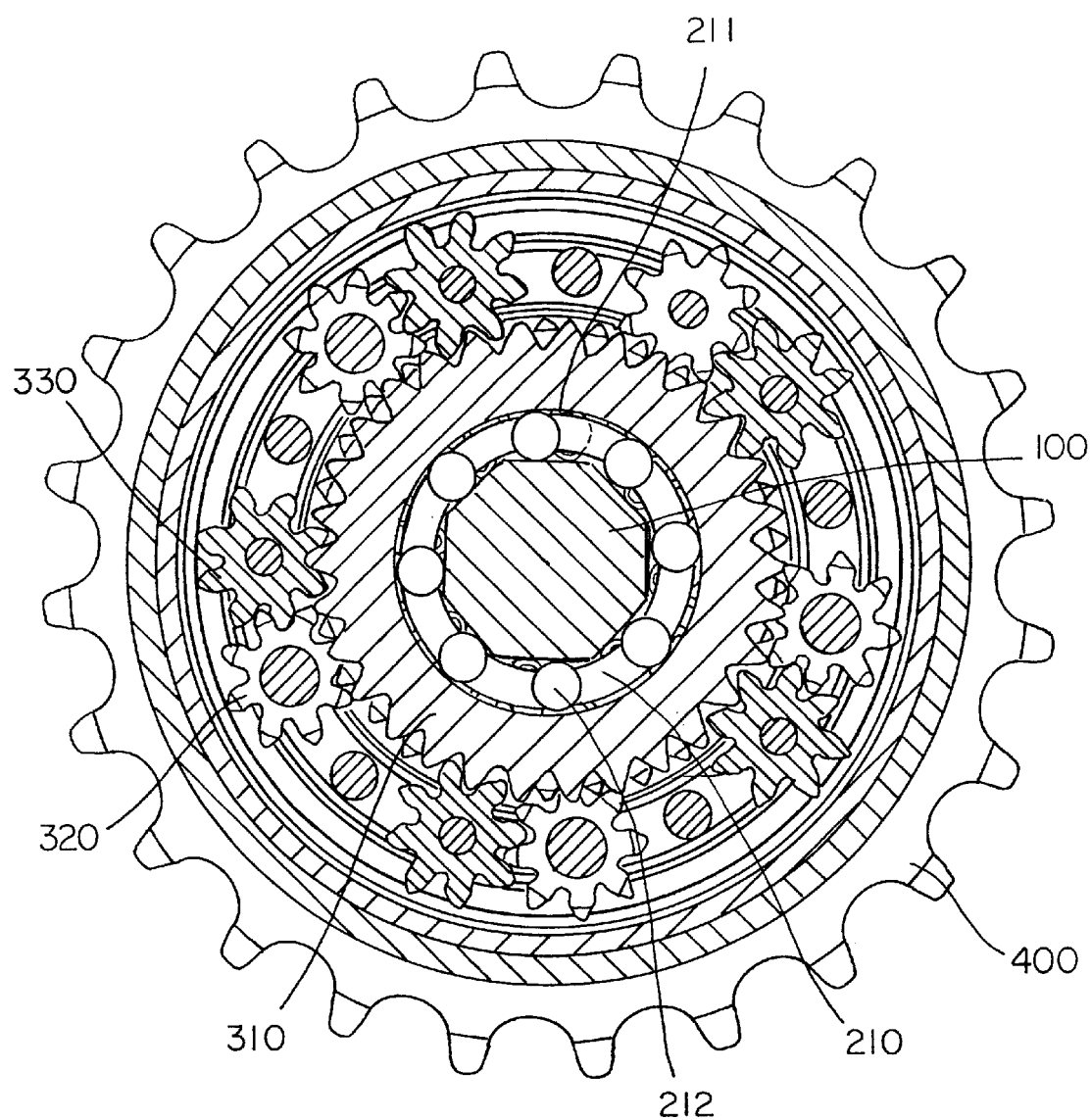
FIG. 3 is an enlarged section view cut along line A–A' of FIG. 1.
Figure 5:
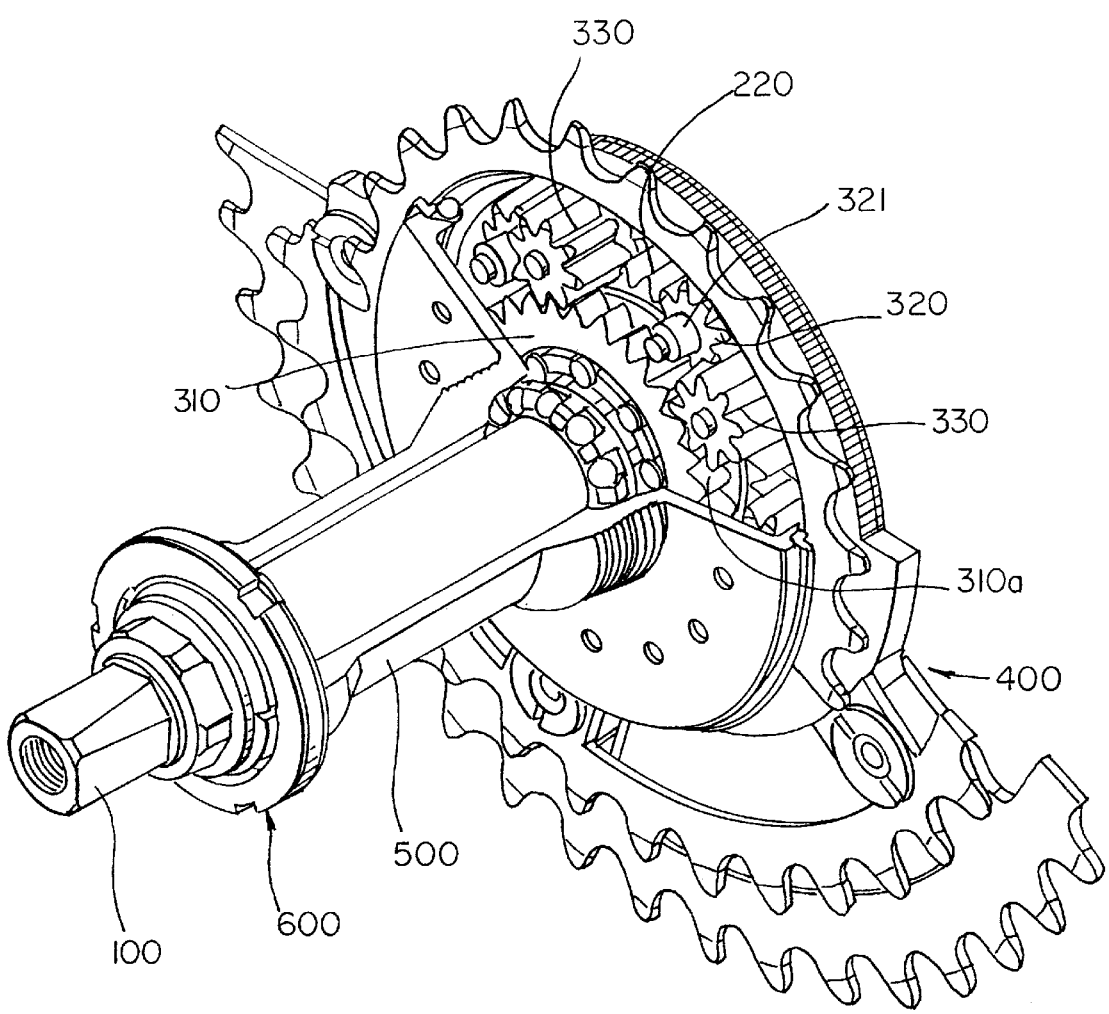
FIG. 5 is a partial cut perspective view showing the drive changing portion of the present invention.

The forward planetary gears 320 and the reverse planetary gears 330 are, as shown in FIGS. 2 and 3, mounted on the shaft housing 500 with pins 321. Actually the forward and reverse planetary gears 320, 330 are the same shapes but the installing position is different as shown in FIG. 2, namely, the reverse planetary gears 320 are installed nearer to the shaft housing 500 than the forward planetary gears 330 because the orientation of the pins 321 are opposite(refer to FIG. 5).

Therefore, the forward planetary gears 320 is engaged with the first sun gear 220 but the reverse planetary gears 330 is engaged with the second sun gear 310.

A set of the forward and reverse planetary gears 320, 330 can function well in the present invention, but plural set is more preferable.

The operation of the apparatus for changing direction of driving force for bicycles, having the above structure, according to the present invention is to be described as follows.

1. Forward traveling by forward pedaling.

When pedaling forward, the pedal shaft 100 rotates with the same direction of a pedal(not shown), namely, the direction indicated by the arrow of FIG. 4A.

Then, the relative position of the forward clutch pin group 211 moves to the clockwise direction of the FIG. 4A, that is, the forward clutch pin group 211 is located near to edge portion of the angular portion 100a. As a result, the pedal shaft 100, the carrier 210, and the first sun gear 220 rotate together.

So the sprocket 400(or the auxiliary sprocket 410) formed along the extended outer circumference of the first sun gear 220 rotates, and the rear wheel connected with the sprocket 400 via chain also rotates, therefore, the bicycle can travel forward.

In this case, due to the rotation of the first sun gear 220, the forward planetary gears 320, which is engaged with the first sun gear, also rotate. And the reverse planetary gears 330 and the second sun gear 310 rotate with the engagement with the forward planetary gears 320. However, because there is no further engagement, the rotation of the reverse planetary gears 330 and the second sun gear 310 are idling.

2. Forward traveling by rearward pedaling.

When pedaling forward, the pedal shaft 100 rotates with the same direction of a pedal(not shown), namely, the direction indicated by the arrow of FIG. 4B.

Then, the relative position of the forward clutch pin group 212 moves to the counterclockwise direction of the FIG. 4B, that is, the forward clutch pin group 212 is located near to the other edge portion of the angular portion 100*a*. As a result, the pedal shaft 100, the carrier 210, and the second sun gear 310 rotate together.

And the reverse planetary gears 330 rotate with the engagement with the second sun gear 310, at the same time, the forward planetary gears 320 and the first sun gear 220 rotate together. However, in the process of rotation of the forward and reverse planetary gears 320, 330, the direction of the rotation is reverting, accordingly, the first sun gear 220 rotates forward. So the sprocket 400(or the auxiliary sprocket 410) formed along the extended outer circumference of the first sun gear 220 rotates, and the rear wheel connected with the sprocket 400 via chain also rotates, therefore, the bicycle can travel forward.

Therefore, when pedaling rearward, also the bicycle travels forward with the operation of the drive changing portion 300.

3. Pulling back of a bicycle.

When pulling back the bicycle, the sprocket 400 rotates rearward by rotation of a rear wheel and the first sun gear 220 also rotates rearward. In this case, there is no engagement between the first sun gear 220 and the carrier 210. The forward planetary gears 320 rotate forward by the rotation of the first sun gear 220, then, the reverse planetary gears 330 and the second sun gear 310 also rotate.

However there is no further engagement between the second sun gear 310 and the carrier 210, as a result, the bicycle can be pulled back without a load like general bicycles.

<Embodiment 2>

Figure 6:
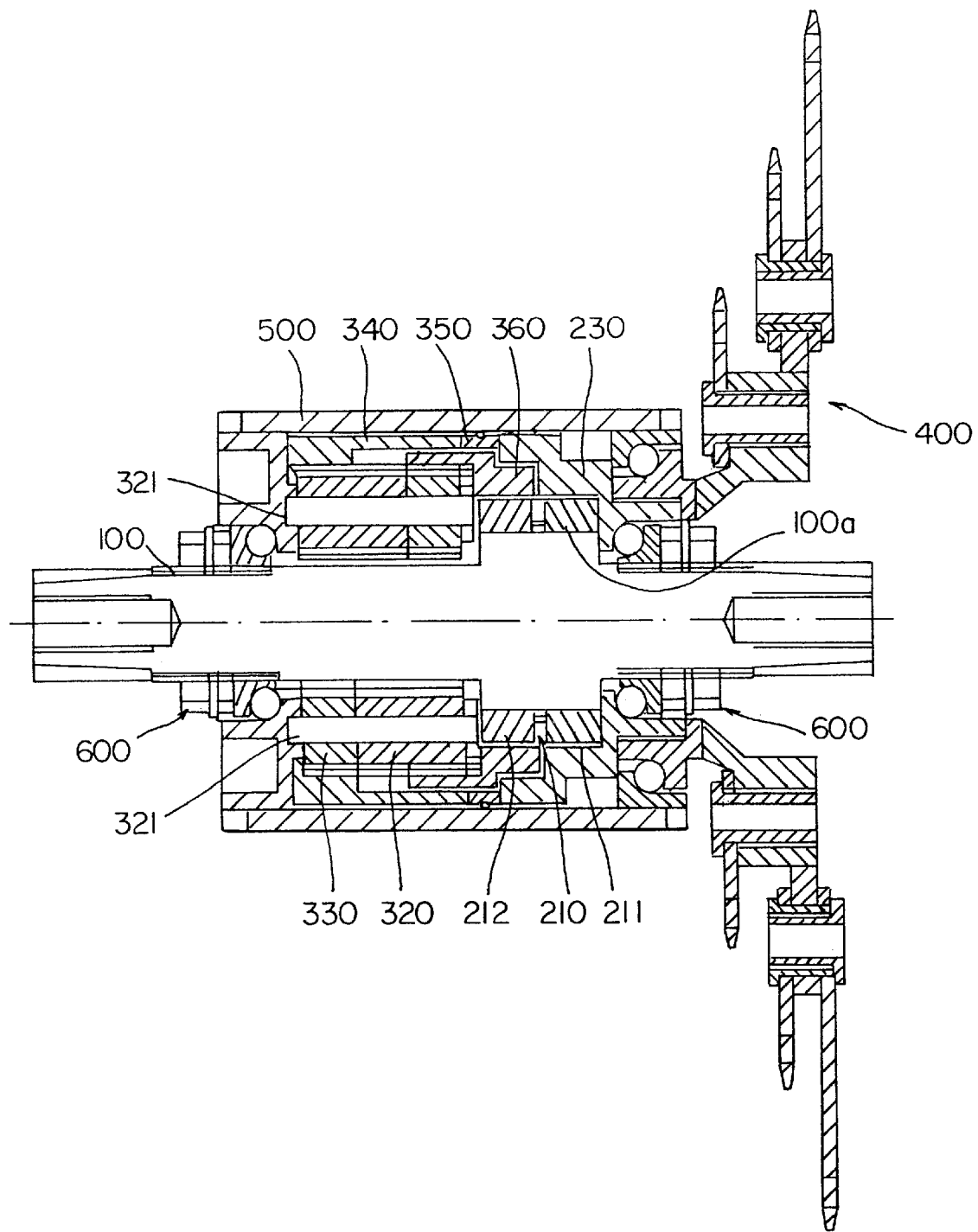
FIG. 6 is a section view of the present invention according to the second embodiment of the present invention, installed inside of the frame of a bicycle.

FIG. 6 is a section view of the present invention according to the second embodiment of the present invention, installed inside of the frame of a bicycle.

On the whole, the composition of the present invention according to the second embodiment of the present invention is the same as the first embodiment, in that, the present invention of an apparatus for changing direction of driving force for bicycles comprises a pedal shaft 100 having angular portion 100*a*, a drive transferring portion 200 which is transferring the driving force of the pedal shaft 100 to a drive changing portion 300 in case of pedaling rearward or to a sprocket 400 directly in case of pedaling forward, said drive changing portion 300 changing the direction of the driving force from the drive transferring portion 200, said a sprocket 400 transferring the driving force to a rear wheel via connection means such as a chain, a shaft housing 500 having a plurality of pin hole 500*a*, and fixing means 600 for fastening above elements.

Hereinafter, explanation of the same structure and the same reference numerals as those of the first embodiment, and description of the operation thereof is abridged.

The drive transferring portion 200 is composed of a carrier 210 which is engaged with the angular portion 100*a*, a forward clutch pin group 211 and a reverse clutch pin group 212 are formed therein, a connecting ring 230 having inner surface which is driven by contacting with the forward clutch pin group 211.

The drive changing portion 300 is composed of an inner gear 360 which is driven by contacting with the reverse clutch pin group 212 and a gear portion is formed along inner circumference therein, forward planetary gears 320 which is engaged with the inner gear 360, reverse planetary gears 330 which is engaged with the forward planetary gears 320 and the ring gear 340 through the connecting ring 230 at the same time.

The sprocket 400 is installed on the connecting ring 230.

That is, the drive transferring portion of this embodiment is the same as the first embodiment, but the reverse planetary gears 330 is connected to the sprocket 400 through the ring gear 340 in order to be taken small space.

<Embodiment 3>

Figure 7:
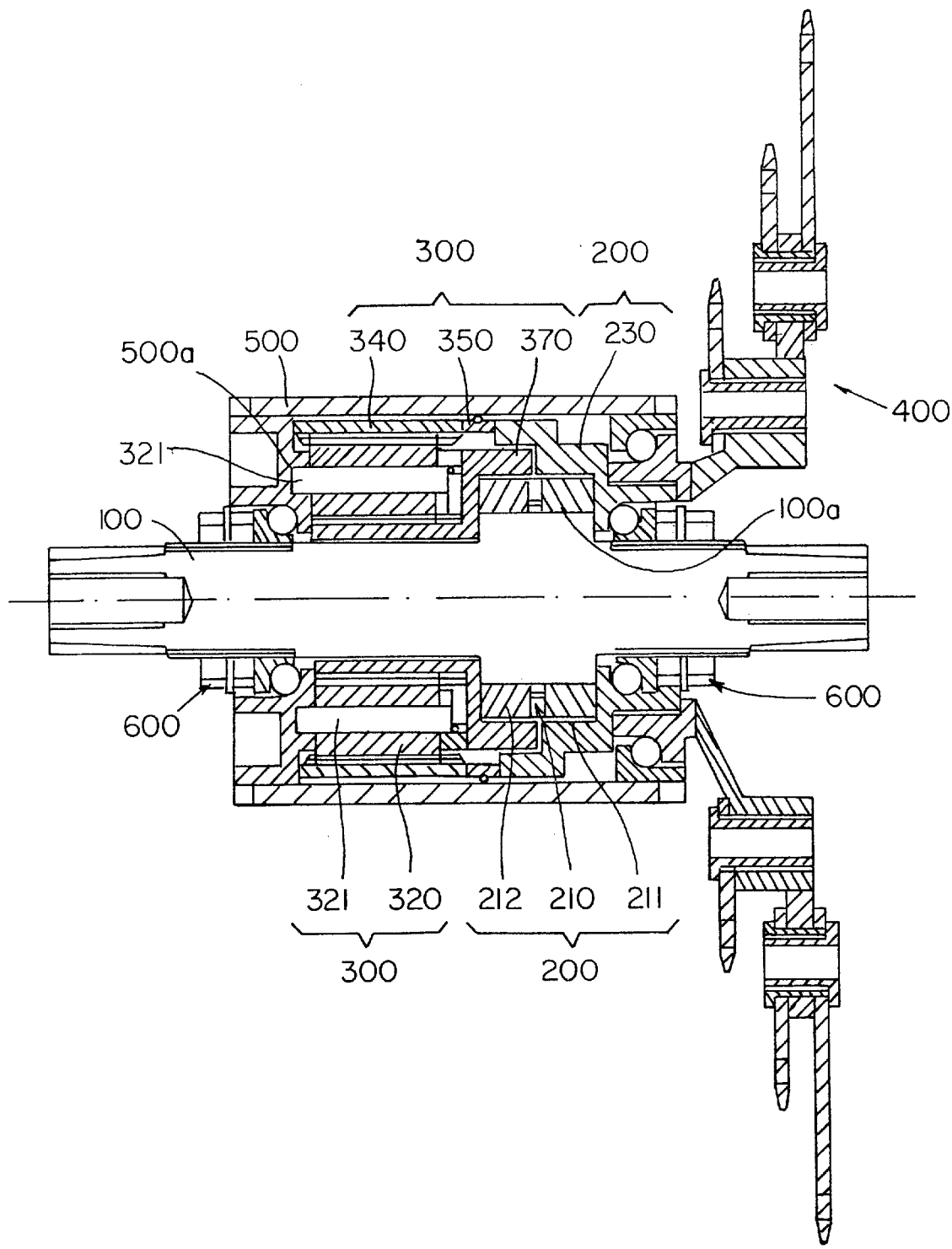
FIG. 7 is a section view of the present invention according to the third embodiment of the present invention, installed inside of the frame of a bicycle.

FIG. 7 is a section view of the present invention according to the third embodiment of the present invention, installed inside of the frame of a bicycle.

On the whole, the composition of the present invention according to the third embodiment of the present invention is the same as the first embodiment, in that, the present invention of an apparatus for changing direction of driving force for bicycles comprises a pedal shaft 100 having angular portion 100*a*, a drive transferring portion 200 which is transferring the driving force of the pedal shaft 100 to a drive changing portion 300 in case of pedaling rearward or to a sprocket 400 directly in case of pedaling forward, said drive changing portion 300 changing the direction of the driving force from the drive transferring portion 200, said a sprocket 400 transferring the driving force to a rear wheel via connection means such as a chain, a shaft housing 500 having a plurality of pin hole 500*a*, and fixing means 600 for fastening above elements.

Hereinafter, explanation of the same structure and the same reference numerals as those of the first embodiment, and description of the operation thereof is abridged.

The drive transferring portion 200 is composed of a carrier 210 which is engaged with the angular portion 100*a*, a forward clutch pin group 211 and a reverse clutch pin group 212 are formed therein, a connecting ring 230 having inner surface which is driven by contacting with the forward clutch pin group 211, namely, is the same as that of the second embodiment.

However, the drive changing portion 300 is composed of a sun gear 370 which is driven by contacting with the reverse clutch pin group 212 and a gear portion is formed along outer circumference therein, planetary gears 320 which is engaged with the sun gear 370, a ring gear 340 which is engaged with the planetary gears 320 and connected to the connecting ring 230 through the connecting portion 350 at the same time.

That is, one set of the planetary gears and the ring gear is adopted for the drive changing portion, instead of two set of the planetary gears.

<Embodiment 4>

Figure 8:
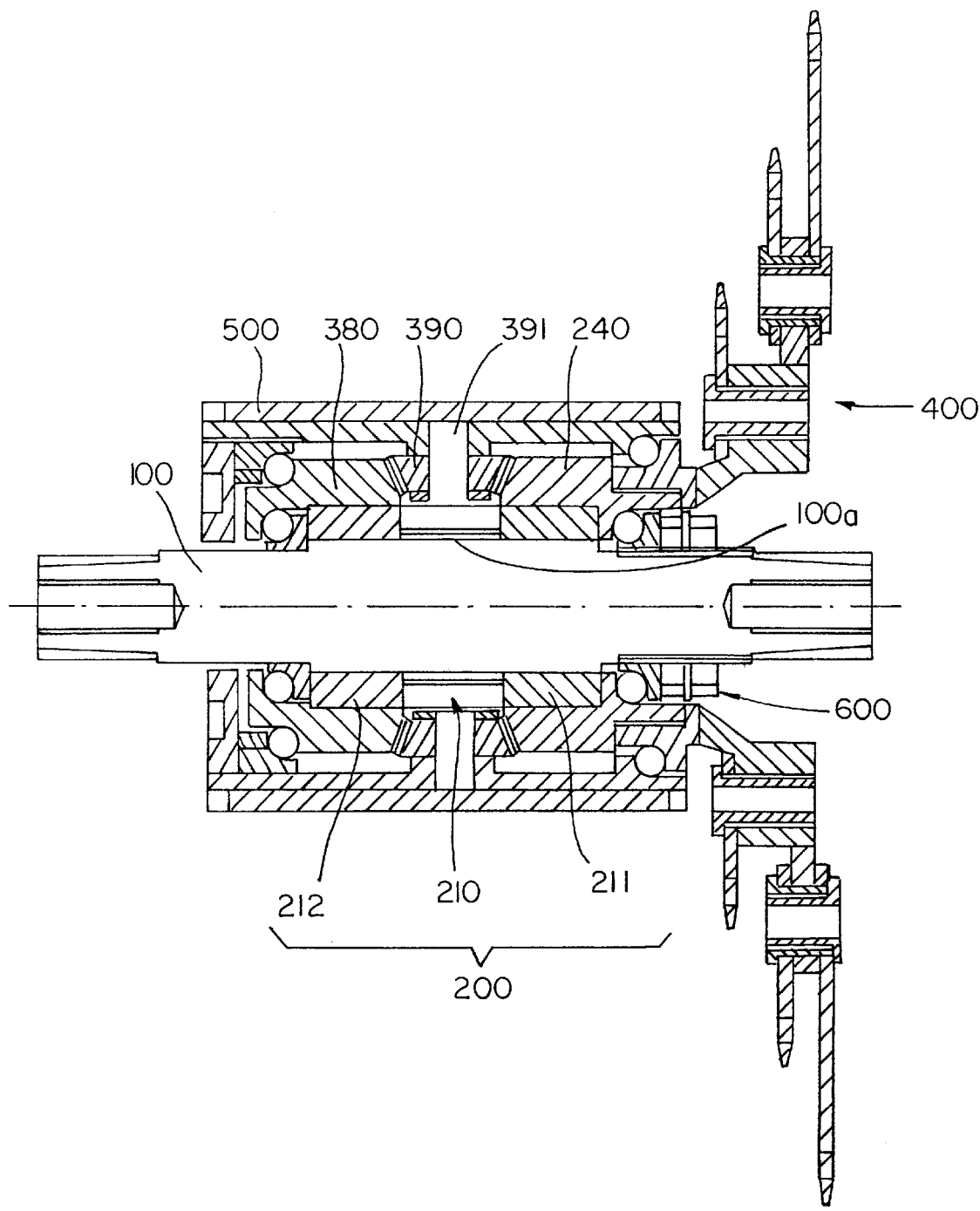
FIG. 8 is a section view of the present invention according to the fourth embodiment of the present invention, installed inside of the frame of a bicycle.

FIG. 8 is a section view of the present invention according to the fourth embodiment of the present invention, installed inside of the frame of a bicycle.

On the whole, the composition of the present invention according to the fourth embodiment of the present invention is the same as the first embodiment, in that, the present invention of an apparatus for changing direction of driving force for bicycles comprises a pedal shaft 100 having angular portion 100a, a drive transferring portion 200 which is transferring the driving force of the pedal shaft 100 to a drive changing portion 300 in case of pedaling rearward or to a sprocket 400 directly in case of pedaling forward, said drive changing portion 300 changing the direction of the driving force from the drive transferring portion 200, said a sprocket 400 transferring the driving force to a rear wheel via connection means such as a chain, a shaft housing 500 having a plurality of pin hole 500a, and fixing means 600 for fastening above elements.

Hereinafter, explanation of the same structure and the same reference numerals as those of the first embodiment, and description of the operation thereof is abridged.

The drive transferring portion 200 is composed of a carrier 210 which is engaged with the angular portion 100a, a forward clutch pin group 211 and a reverse clutch pin group 212 are formed therein, a connecting gear 240 having inner surface which is driven by contacting with the forward clutch pin group 211 and having a gear portion therewith.

The drive changing portion 300 is composed of a first bevel gear 380 which is driven by contacting with the reverse clutch pin group 212 and a gear portion is formed therewith, a second bevel gear 390 which is engaged with the first bevel gear and the gear portion of the connecting gear 240 at the same time.

INDUSTRIAL APPLICABILITY

As described above, the apparatus for changing direction of driving force for bicycles of the present invention can travel bicycles forward by pedaling forward, and travel forward or idle by pedaling rearward. In addition, having simple structure and taking up small space, it can be installed on the outer portion of a pedal shaft, rear a wheel hub, more over, in the frame of bicycles. Also the present invention makes little noise because there is no engagement of ratchets and pins, and it does not need to manipulate a lever in order to travel bicycles forward by pedaling rearward, and can be pulled back without a load like general bicycles.

What is claimed is:

1. An apparatus for changing direction of driving force for bicycles, the apparatus comprising:

a pedal shaft having angular portion;

a drive transferring portion composed of a carrier which is engaged with the angular portion, a forward clutch pin group and a reverse clutch pin group are formed therein, a connecting ring having inner surface which is driven by contacting with the forward clutch pin group;

a drive changing portion composed of a sun gear which is driven by contacting with the reverse clutch pin group and a gear portion is formed along outer circumference therein, planetary gears which are engaged with the sun gear, a ring gear which is engaged with the forward planetary gears and connected to the connecting ring through the connecting portion at the same time;

a sprocket which is installed on the connecting ring;

a shaft housing having a plurality of pin holes;

fixing means for fastening above elements.

\* \* \* \* \*